(12) United States Patent
Sugita et al.

(10) Patent No.: US 6,171,700 B1
(45) Date of Patent: Jan. 9, 2001

(54) CURABLE COMPOSITE MATERIAL COMPOSITION AND CURING PROCESS THEREFOR

(75) Inventors: Shuichi Sugita; Hirotoshi Kamata, both of Chiba; Tomio Yamamoto, Honjo; Kazuo Ohtani, Kumagaya; Hidetake Sendai, Kawasaki, all of (JP)

(73) Assignees: Showa Denko Kabushiki Kaisha; Showa Highpolymer., Ltd., both of Tokyo (JP)

( * ) Notice: Under 35 U.S.C. 154(b), the term of this patent shall be extended for 0 days.

(21) Appl. No.: 08/813,237

(22) Filed: Mar. 7, 1997

(30) Foreign Application Priority Data

Mar. 8, 1996 (JP) .................................................. 8-080760
Dec. 5, 1996 (JP) .................................................. 8-325643

(51) Int. Cl.$^7$ ............................. C08K 7/04; C08L 63/02; C08L 33/06; C08L 67/02
(52) U.S. Cl. ..................... 428/408; 428/413; 428/480; 428/522; 522/26; 523/468; 525/117; 525/119; 525/165; 525/227; 525/437; 525/438; 526/196; 528/303; 528/306
(58) Field of Search .................... 526/196; 428/408, 428/413, 480, 522; 522/26; 523/468; 525/437, 438, 117, 119, 165, 227; 528/303, 306

(56) References Cited

U.S. PATENT DOCUMENTS

| 3,479,185 | * 11/1969 | Chambers, Jr. .................. 96/84 |
| 4,459,349 | 7/1984 | Tanaka et al. ................... 430/281 |
| 5,952,152 | * 9/1999 | Cunninghm et al. ............. 522/7 |

FOREIGN PATENT DOCUMENTS

7248621 * 3/1994 (JP) .
6329712 * 11 1994 (JP) .

OTHER PUBLICATIONS

English Abstract of L.*

* cited by examiner

Primary Examiner—Donald R. Wilson
(74) Attorney, Agent, or Firm—Sughrue, Mion, Zinn, Macpeak & Seas, PLLC

(57) ABSTRACT

A curable composite material composition comprising
(A) a polymerizable unsaturated compound,
(B) a fiber reinforcing material and/or fiber, and
(C) a polymerization initiator comprising an organic boron compound represented by the general formula (1)

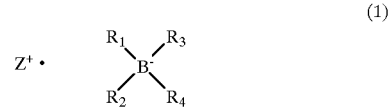

(1)

wherein $R_1$, $R_2$, $R_3$ and $R_4$ each independently represent an alkyl, aryl, allyl, aralkyl, alkenyl, alkynyl, silyl or heterocyclic group, a halogen atom, or a substituted alkyl, substituted aryl, substituted allyl, substituted aralkyl, substituted alkenyl, substituted alkynyl or substituted silyl group, and $Z^+$ represents a cation, and an acidic compound, as well as a curing process for the curable composite material composition which includes irradiating and/or heating the curable composite material composition.

12 Claims, No Drawings

CURABLE COMPOSITE MATERIAL COMPOSITION AND CURING PROCESS THEREFOR

BACKGROUND OF THE INVENTION

1. Field of the Invention

The present invention relates to a fiber-reinforced composite material composition and a process for curing it. More specifically, it relates to a curable fiber-reinforced resin composition which is quickly curable by a safe and simple process, and which can be used for various types of molding, including hand lay-tip molding, spray-up molding, resin transfer molding (hereunder abbreviated to RTM) and vacuum-assisted resin injection molding (hereunder abbreviated to VARI), and to a process for curing it.

2. Description of the Related Art

Fiber-reinforced resin compositions, which are composite materials of reinforcing fibers and resins, are known conventionally as FRPs, and are widely used for many different purposes. Of the various FRP molding processes, spray-up molding, RTM and the like require rapid curing for reasons of workability and mold cycling-up. However, spray-up molding involves normal, temperature curing using a peroxide-based catalyst, and has therefore been associated with such problems as greater temperature effect, difficult adjustment of the curing time, and the need for addition of large amounts of peroxide-based catalyst for improvement of the molding cycle.

In addition, when glass fibers are impregnated with a resin by the spray method, degassing must be performed with a roller to eliminate the incorporated air bubbles, and since this step requires much man-power, recent improvements have been made such as modifications and additives to the resin composition, and thus degassing has been moving in a direction toward greater simplification. Simplification of the degassing makes possible a higher speed molding cycle, but with normal temperature curing of conventional peroxide-based catalysts, the difficulty in adjusting the curing times, due to unsatisfactory curing during winter and gelation of the resin solution during molding operations during summer, etc., have led to the problem of serious defects in the products.

On the other hand, when the spraying surface is at a near-perpendicular angle the sprayed resin composition drips before it cures, resulting in a non-uniform thickness of the product and thus leading to a lack of strength or to water leakage. It has been impossible to perfectly prevent this dripping even by rendering the resin solution thixotropic.

Furthermore, in order to increase the speed of the molding cycle with RTM, VARI, etc., it is necessary either to heat the mold or adjust the amount of the peroxide-based catalyst for normal temperature curing. For heating of the mold, it is difficult to guarantee the heat source particularly when forming particularly large molded products, and when the amount of the catalyst is adjusted it is impossible to avoid reduction in the product quality due to the difficulty of adjusting the curing time to counter unsatisfactory curing in winter and gelation, during the injection operation during summer.

Methods aimed at overcoming these problems have been proposed, which employ photocuring with ultraviolet light, visible light, etc., to allow the curing reaction to take place at a lower temperature and in a shorter time (for example, H. Shreiber, Plastverarbeiter, 33 (4)404, 1982, and Japanese Unexamined Patent Publication No. 2-97503). However, when large amounts of reinforcing fibers or inorganic fillers are included, or the molded product thickness is large, curing of the interior or back side thereof with ultraviolet light or visible light has been difficult.

In addition, it is particularly difficult for simple light irradiation to accomplish curing to the interior or back side of carbon fiber-type and aramid fiber-type resin compositions which are largely impermeable to light, and for example, Japanese Unexamined Patent Publication No. 8-57971 proposes a method whereby a carbon fiber-reinforced resin composition is cured by irradiation in the presence of a near-infrared light or visible light photoinitiator or a thermal polymerization initiator; however, unless curing of carbon fiber-reinforced resin compositions by this method is carried out with a light source which generates large amounts of heat and the initiator used is capable of initiating polymerization not only by light but also by heat, it is impossible to achieve curing to the interior or back side of the composition.

In fact, in cases where sufficient usable life of the resin composition containing the initiator is required and stability of the initiator is an object, it is necessary to use an initiator which initiates polymerization at high temperatures in order to prevent decomposition of the initiator at the storage temperature, and this is a disadvantage in that curing of the composition therefore requires large light irradiation equipment with large amounts of heat generation. Also, usable reinforcing fiber materials are limited to carbon fibers, and it has not been possible to employ materials reinforced with aramid fibers or glass fibers.

In addition to this proposed method there are known polymerizable compositions containing novel polymerization initiators consisting of combinations of organic boron compounds and acidic compounds (Japanese Unexamined Patent Publication No. 6-329712, and Japanese Unexamined Patent Publication No. 8-3210), and although highly safe polymerization initiation systems have also been proposed therefor, the effect on polymerizable compounds which are used industrially, such as unsaturated polyester resins and vinyl ester resins has been inadequate, while there have been absolutely no reports of their application to FRPs mentioned above, and therefore they have been unsuitable for practical use.

SUMMARY OF THE INVENTION

In light of these circumstances, it is an object of the present invention to provide a novel curable composite material composition with low curing variability depending on the type or amount of fiber reinforcing material, and which is industrially applicable either for mixture just before the curing reaction or in the state of a single solution or prepreg, as well as a process for curing it.

As a result of diligent research by the present inventors aimed at overcoming the aforementioned disadvantages, we have achieved the object described above by the development of a curable composite material composition containing (A) a polymerizable unsaturated compound, (B) a fiber reinforcing material and/or filler, and (C) a polymerization initiator comprising (a) an organic boron compound represented by the general formula (1)

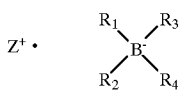

(1)

wherein $R_1$, $R_2$, $R_3$ and $R_4$ each independently represent an alkyl, aryl, allyl, aralkyl, alkenyl, alkynyl, silyl or heterocyclic group, a halogen atom, or a substituted alkyl, substituted aryl, substituted allyl, substituted aralkyl, substituted alkenyl, substituted alkynyl or substituted silyl group, and $Z^+$ represents a cation, (b) an acidic compound and (c) a hexaarylbiimidazole, as well as a process for curing the curable composite material composition which comprises irradiating and/or heating the aforementioned curable composite material composition.

DESCRIPTION OF THE PREFERRED EMBODIMENTS

The polymerization initiator used according to the invention is a combination of an organic boron compound and an acidic compound, but further addition of a hexaarylbiimidazole compound represented by the general formula (2)

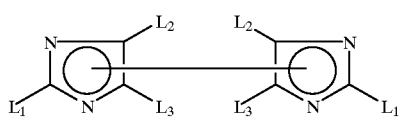

(2)

wherein $L_1$, $L_2$ and $L_3$ each independently represent an aryl group or substituted aryl group, is preferred.

Specific examples of hexaarylbiimidazole compounds include bis(2,4,5-triphenylimidazole), bis(2-o-chlorophenyl-4,5-diphenylimidazole), bis(2-o,p-dichlorophenyl-4,5-diphenylimidazole) and bis(2-o-bromophenyl-4,5-diphenylimidazole). Hexaarylbiimidazole compounds are described in more detail in Japanese Examined Patent Publication No. 41-3545.

It has been conventionally known that hexaarylbiimidazole compounds can be used as polymerization initiators by combination with various compounds such as hydrogen-donating compounds, and examples of disclosed methods include methods involving combinations with tertiary amines and leuco dyes (Japanese Examined Patent Publication No. 45-37377), methods involving combinations with chain transfer agents and visible light-absorbing compounds and polymerization with visible light (Japanese Unexamined Patent Publication Nos. 47-2528, 57-21401, and 59-56403), and methods involving combinations with 2-polycyclicarylbiimidazole compounds and hydrogen-donating compounds with polymerization with ultraviolet light (Japanese Unexamined Patent Publication Nos. 57-161742, and 58-45210).

However, combination of hexaarylbiimidazole compounds with organic boron compounds and acidic compounds as polymerization initiators has been unknown to the prior art.

Hexaarylbiimidazole compounds usually have poor solubility, and they often are insufficiently soluble in the polymerizable unsaturated compounds used according to the invention. Therefore the use of a commonly known highly polar solvent, for example a cyclic compound such as N-methylpyrrolidone or γ-butyrolactone, is preferred.

The optimum amount of the hexaarylbiimidazole compound to be added will differ depending the type and amount of polymerizable compound as well as the type and amount and thickness of the fiber reinforcing material, but it is generally added at 0–20 wt % of the polymerizable compound. It is preferably added at 0.05–15 wt %. An excessive amount is not economically advantageous, and also tends to result in inferior physical properties of the cured product and precipitation of solids due to the poor solubility.

The polymerizable unsaturated compound used in the composition of the invention may be an unsaturated polyester resin, vinyl ester resin, polyester acrylic or methacrylic acid condensed resin, ethylenically unsaturated group-containing polyurethane resin, phosphorus-containing vinyl ester resin, ethylenically unsaturated group-containing acrylic resin, ethylenically unsaturated group-containing silicone resin or ethylenically unsaturated group-containing melamine resin. Among these, unsaturated polyester resins and vinyl ester resins are particularly preferred.

The unsaturated polyester resin may be produced by a publicly known method, and specifically it is produced by reacting an acid component selected from polybasic acids with no active unsaturated bonds or anhydrides thereof such as phthlalic anhydride, isophthalic acid, terephthalic acid, tetrahydrophthalic acid, adipic acid, sebacic acid, etc., unsaturated polybasic acids with active unsaturated bonds or anhydrides thereof such as fumaric acid, maleic anhydride, maleic acid, itaconic acid, etc., and if necessary monocarboxylic acids such as benzoic acid, abietic acid or dicyclopentadienyl maleate, with an alcohol component selected from polyhydric alcohols such as ethylene glycol, propylene glycol, diethylene glycol, dipropylene glycol, 1,2-butanediol, 1,3-butanediol, 1,4-butanediol, 1,5-pentanediol, 1,6-hexanediol, 2-methyl-1,3-propanediol, 2,2-dimethyl-1,3-propanediol, cyclohexane-1,4-dimethanol, ethylene oxide adducts of bisphenol A and propylene oxide adducts of bisphenol A. Specific suitable examples of unsaturated polyester resins include Rigolak 4214, 2141, G-200, 1557, 2063, 5270, TR-117, RI-501, RI-102, RI-201, 158BQT, etc., which are trade names of Showa Highpolymer Co., Ltd.

The vinyl ester resin may also be produced by a publicly known method, and it is an epoxy acrylate or methacrylate obtained by reacting (meth)acrylic acid with an epoxy resin, or a polyester acrylate or methacrylate obtained by reacting an epoxy compound containing an α,β-unsaturated carboxylic ester group with a polyester having a terminal carboxylic group obtained from a saturated dicarboxylic acid and/or unsaturated dicarboxylic acid and a polyhydric alcohol. The epoxy resin used as the raw material for the vinyl ester resin may be bisphenol. A-diglycidyl ether or a high molecular analogue thereof, or a novolak-based polyglycidyl ether.

The saturated dicarboxylic acid used as a raw material may be a dicarboxylic acid with no active unsaturated groups, such as phthalic acid, isophthalic acid, terephthalic acid, tetrahydrophthalic acid, adipic acid or sebacic acid. The unsaturated dicarboxylic acid may be a dicarboxylic acid with an active unsaturated group, such as fumaric acid, maleic acid, fumaric anhydride or itaconic acid. The polyhydric alcohol component may be a polyhydric alcohol such as, for example, ethylene glycol, propylene glycol, diethylene glycol, dipropylene glycol, 1,2-butanediol, 1,3-butanediol, 1,4-butanediol, 1,5-pentanediol, 1,6-hexanediol, 2-methyl-1,3-propanediol, 2,2-dimethyl-1,3-propanediol, cyclohexane-1,4-dimethanol, an ethylene oxide adduct of bisphenol A or a propylene oxide adduct of bisphenol A. A representative epoxy compound containing an α,β-unsaturated carboxylic ester group is glycidyl methacrylate.

Specific examples of vinyl ester resins include the bisphenol A-based vinyl ester resins Ripoxy R-808, R-806, R-804 and R-802, trade names of Showa Highpolymer Co., Ltd, the brominated bisphenol A-based vinyl ester resins Ripoxy S-510 and S550, trade names of Showa Highpolymer Co., Ltd, and the novolak-based vinyl ester resins Ripoxy H-600, H-630, H-610 and H-6001, trade names of Showa Highpolymer Co., Ltd.

The above-mentioned unsaturated polyester or vinyl ester resin is preferably highly unsaturated, preferably with an unsaturated group equivalency (molecular weight per unsaturated group) of about 100–800. Synthesis may be impossible with less than 100 unsaturated group equivalency, and with greater than 800 unsaturated group equivalency the density of reactive groups may be too low, thus slowing the curing reaction and possibly preventing a product with high hardness.

The polymerizable unsaturated compound is preferably selected from urethane resins with an ethylenically unsaturated group, which are generally known as urethane acrylate resins. Examples include resins obtained by condensation of pentaerythritol triacrylate or glycerin dimethacrylate at both ends of hexamethylene diisocyanate, and resins obtained by condensation of tolylene diisocyanate with phenylglycidyl ether acrylate or glycerin dimethacrylate.

In addition, the polymerizable unsaturated compound also encompasses oligomers such as products obtained by reacting acrylic acid and/or methacrylic acid with adducts of polyhydric alcohols and ethylene oxide; products obtained by reacting acrylic acid and/or methacrylic acid with adducts of the above-mentioned polyhydric alcohols and propylene oxide; and products obtained by reacting acrylic acid and/or methacrylic acid with adducts of the above-mentioned polyhydric alcohols and $\epsilon$-caprolactone. In addition to the compounds mentioned above, the polymerizable unsaturated compound also includes those compounds described in Japanese Unexamined Patent Publication No. 4-362935 and Japanese Unexamined Patent Publication No. 6-75374.

The compositions according to the invention may also contain reactive diluents such as styrene monomers and methyl methacrylate. The reactive diluent increases the impregnability with the fiber reinforcing material during production of the composite material composition, while also important for adjusting the hardness, strength, chemical resistance and water resistance of the molded product, and is used at 0–250 parts by weight, and preferably 20–100 parts by weight based on 100 parts by weight of the other polymerizable unsaturated compounds in the composition of the invention. When used in an amount exceeding 250 parts, the chemical resistance against solvents, etc., may be rendered extremely poor.

Specific monomers which may be used as reactive diluents include aromatic monomers such as styrene, $\alpha$-methylstyrene, p-methylstyrene, chlorostyrene; acrylate and methacrylate monomers such as methyl methacrylate, isobutyl acrylate or methacrylate, isobornyl acrylate or methacrylate, dicyclopentenyl acrylate or methacrylate, dicyclopentenyloxyethyl acrylate or methacrylate, 2-hydroxy-3-phenoxypropyl acrylate or methacrylate, 2-hydroxyethyl acrylate or methacrylate, 2-hydroxypropyl acrylate or methacrylate, polyoxyethylene acrylate or methacrylate; and N-substituted acrylamides such as N,N-dimethylacrylamide, N,N-diethylacrylamide and N-acryloylmorpholine.

Various curable (meth)acrylic compounds may also be added if necessary. Examples of curable (meth)acrylic compounds include acrylates and methacrylates such as diethylene glycol diacrylate or dimethacrylate, 1,6-hexanediol diacrylate or dimethacrylate, trimethylolpropane triacrylate or trimethacrylate, pentaerythritol triacrylate or trimethacrylate or pentaerythritol tetraacrylate or tetramethacrylate; and urethane acrylates or methacrylates obtained by reaction between hydroxyalkyl acrylates or methacrylates and compounds with at least 2 isocyanate groups.

The fiber reinforcing material used according to the invention may be made of organic and/or inorganic fibers, and for example publicly known ones such as glass fibers, carbon fibers, aramid fibers, polyethylene terephthalate fibers and vinylon fibers (polyvinyl alcohol-based fibers) may be used. These fibers may, of course, be used in combinations of 2 or more. Preferred among these fiber reinforcing materials for use according to the invention are carbon fibers and aramid fibers, which have been difficult to apply to methods known to the prior art and which have excellent material characteristics including strength. Naturally, it is also suitable to use glass fibers which are most widely used for FRP fiber reinforcing materials.

The amount of fiber reinforcing material to be used according to the invention may preferably be 1–300 parts by weight, more preferably 5–200 parts by weight, and especially 10–100 parts by weight, based on 100 parts by weight of the polymerizable unsaturated compound.

The filler used according to the invention may be an inorganic filler, organic filler or a polymer, and the inorganic fiber may include publicly known ones which comprise, for example, calcium carbonate, talc, clay, glass powder, silica, aluminum hydroxide, barium sulfate and titanium oxide. These inorganic fillers may, of course, be used in combinations of 2 or more, and they may be used in an amount of 0–300 parts by weight, and preferably 0–200 parts by weight, based on 100 parts by weight of the polymerizable unsaturated compound. When the inorganic filler is present at greater than 300 parts by weight, the viscosity may be increased thus lowering the impregnability, residual bubbles tend to occur, and there may be insufficient mobility during molding which hampers cohesion to the mold and also lowers the quality.

In addition, as the organic filler or polymer used for the invention there may be added a publicly known compound which also acts as a contraction-reducing agent, such as polystyrene, polyvinyl acetate, polymethyl methacrylate, polyvinylidene chloride microballoons, polyacrylonitrile microballoons, etc. When added as a contraction-reducing agent it is added in an amount of 0–40 parts by weight and preferably 0–30 parts by weight based on 100 parts by weight of the polymerizable unsaturated compound. Use of a contraction-reducing agent in an amount exceeding 40 parts by weight may lead to an overly high viscosity, thus lowering the moldability, and also may lower the smoothness and heat resistance of the cured product surface.

A pigment may also be used if necessary according to the invention. The pigment used is not particularly limited and may be, for example, an organic pigment or inorganic pigment, used in an amount of 0–20 parts by weight and preferably 0–10 parts by weight based on 100 parts by weight of the polymerizable unsaturated compound, in consideration of the polymer curability.

Examples of the cation $Z^+$ in the organic boron compound represented by general formula (1) used according to the invention include quaternary ammonium cations, quaternary pyridinium cations, quaternary quinolinium cations, diazonium cations, tetrazonium cations, sulfonium cations, oxosulfonium cations, metal cations such as sodium, potassium, lithium, magnesium and calcium, (organic) compounds with a cationic charge on an oxygen atom, such as flavinium and pyranium, carbocations such as tropylium and cyclopropylium, halogenium cations such as iodonium, and cations of metal compounds such as arsenic, cobalt, palladium, chromium, titanium, tin and antimony.

Upon contacting the organic boron compound and the acidic compound, the organic boron compound decomposes and the generated radical cures the curable resin composition; the acidic compound used may be appropriately selected depending on the acid strength and amount needed to achieve the desired curing rate. That is, the composition may be cured by any appropriate mixing method, such as mixing either one of the organic boron compound and the acidic compound with the other components first and then contacting it with the other just before curing, or using a mixing nozzle or the like to mix the 3 or more components simultaneously.

Specific examples of acidic compounds to be used according to the invention include common inorganic acids which are known as Brønsted acids, such as hydrochloric acid, sulfuric acid, nitric acid, etc.; organic acids such as acetic acid, propionic acid, maleic acid, adipic acid, (meth)acrylic acid, benzoic acid, phthalic acid and other carboxylic acids; and p-toluenesulfonic acid, methanesulfonic acid, trifluoromethanesulfonic acid and other sulfonic acids. In addition, hydroxy group-containing compounds such as phenols and alcohols, compounds with mercapto groups such as thiols, and substances known as Lewis acids which accept electron pairs to form covalent bonds, such as aluminum chloride, tin (II) chloride, boron trichloride, boron tribromide, etc., may be used. These acids are explained in detail, for example, in R. T. Morrison & R. N. Boyd, "Organic Chemistry", Third Edition, p.43 (Japanese edition).

In addition to these, acidic ion-exchange resins, carbon black, alumina and other substances with acidic active sites on solid surfaces, or hydrogen chloride, sulfurous acid gas and other acidic gas compounds may also be used.

Particularly preferred among such acidic compounds are maleic acid, maleic anhydride, fumaric acid and their half esters, (meth)acrylic acid, itaconic acid and other acidic compounds with polymerizable unsaturated groups, and oligomers and polymers thereof with functional groups.

The acidic compound in the polymerizable unsaturated compound of the invention may preferably have an acid value in the range of 0.1–100 mgKOH/g, and especially 5–50 mgKOH/g.

According to the invention, the acidic compound used may be a latent acid-generating agent. A latent acid-generating agent is a substance which is not itself an acidic substance, but upon the action of heating or moisture or oxygen, decomposes or reacts to give an acidic compound.

Substances are also known which generate acidic compounds upon decomposition with light irradiation, and for example compounds known as photocationic polymerization initiators are also acidic compounds usable for the invention. Various compounds are known as photocationic polymerization initiators, including diazonium compounds, sulfonium compounds, iodonium compounds, metal complex compounds, sulfonic acid esters, etc., and a detailed description thereof is found in "Kinozairyo", October, 1985 issue, p.5: "Applied UV/EB Curing Techniques and Markets", published 1989 by CMC Co., p.78.

These compounds, which should also be referred to as latent catalysts, do not exhibit activity under normal conditions but first exhibit activity when subjected to a certain stimulus, and according to the invention they are latent acid-generating agents which generate the acidic compound only when subjected to a certain stimulus.

Latent catalysts, which include the latent acid-generating agents, are described in detail in, for example, "Lectures on Polymer Possibilities" (4/20/1995, sponsored by the Society of Polymer Science, Japan), Lecture Summaries, p.13.

The latent acid-generating agent is preferably a compound which generates an acid by light or heat, considering factors such as ease of acquisition, economy, stability in the composition and workability. More preferably it is a heat-induced acid-generating compound, and organic sulfonium compounds which generate acids when decomposed by heat are particularly suitable. An organic sulfonium compound usually consists of an ion pair of a sulfonium cationic part and an anionic part as the counter ion, having 3 substituents such as alkyl or aryl, and from the standpoint of compound stability, acidic compound generation and acid strength of the generated acidic compound, at least one of the sulfonium salt substituents is preferably an aryl group such as an unsubstituted or substituted phenyl group or an unsubstituted or substituted naphthyl group. Examples are sulfonium compounds whose cationic parts are triphenylsulfonium or diphenylsulfonium. Specific examples are CI-2855 and CI-2624 manufactured by Nippon Soda Co., Ltd. and CP-66 and SP-150 manufactured by Asahi Denka Kogyo, KK. When the latent acid-generating agent is used for the acidic compound of the invention, the acid value prior to acid generation is preferably lower from the standpoint of storage stability, or 0–50 mgKOH/g, and more preferably 0–30 mgKOH/g.

Using a latent acid-generating agent allows the composition of the invention to include the organic boron compound which would become unstable in contact with an acidic compound, thus allowing a single solution to be prepared. In other words, this allows stability during storage and then if necessary, decomposition of the latent acid-generating agent with a certain stimulus such as light or heat to cure the composite material composition of the invention. Using this method, it is possible to achieve long-term storage or to prepreg the curable composite material composition.

The composition of the invention may also contain a visible light photoinitiator with sensitivity to the visible light, in order to accelerate the curing reaction. Specific examples include visible light photoinitiators which are used alone, such as camphorquinone, benzyl, trimethylbenzoyl diphenylphosphine oxide, methyl thioxanthone and bis-pentadiphenyltitanium-di(pentafluorophenyl), described in "Hyomen", 27(7), 548(1989) and "Summary of 3rd Polymer Materials Forum", 1BP18(1994), as well as organic peroxide and dyestuff systems, diphenyliodonium salt and dyestuff systems, hexaarylbiimidazole compound and mercaptobenzothiazole and other hydrogen donor compounds, thiopyrilium salts and mercaptobenzothiazole, metal arenes and cyanine dyestuffs, etc. These visible light photoinitiators are photoinitiators with photosensitivity to a wavelength range of 380–700 nm.

The ratio of the organic boron compound and visible light polymerization initiator according to the invention may preferably be 0.1/5–1/0, and especially 0.5/5–5/0.5 in terms of weight ratio.

It has been found that the hexaarylbiimidazole compound used for the invention in combination with the organic boron compound and acidic compound of the invention results in an accelerated curing reaction, but by using well-known methods for use of the compounds according to the prior art, for example combination with a hydrogen donor compound, it can also be used as the aforementioned visible light photoinitiator according to the invention.

The curing reaction may be accelerated by adding the visible light photoinitiator and applying light irradiation simultaneously with or immediately after contact with the organic boron compound and acidic compound, to effectively carry out the reaction between the organic boron compound and the acidic compound, and the reaction of the visible light photoinitiator by light irradiation.

According to the present invention, either the organic boron compound or the acidic compound is first mixed with a resin and then the other is contacted therewith just before curing, or each is combined and admixture with the resin, or the 3 components are simultaneously mixed with a mixing nozzle or the like; thus, there is no need to have any restrictions on the mixing method so long as the amount of acidic compound used, the acid strength, the polymerizability of the polymerizable compound and the desired curing time are determined upon proper consideration.

Here, "contact" refers to mixing the organic boron compound of the invention or the composition containing it with the acidic compound or the composition containing it, so that a chemical reaction occurs between them, and this may be accomplished, for example, by nebulized admixture of both of the two compositions to be mixed or by nebulizing only one of them and spraying it onto the other composition or onto a fiber reinforcing material which has been impregnated therewith, or by introducing a polymerizable unsaturated compound containing an organic boron compound (or a fiber reinforcing material impregnated therewith) into a reactor containing the vaporized acidic compound.

Also, when a latent acid-generating agent is used as described above, the lack of acidity of the latent acid-generating agent itself allows the composition to be stably produced, stored or transported even if all of the components of the composition of the invention are mixed together beforehand, so long as the amount of acid and acid strength of the other components is controlled. That is, the composition of the invention may be used not only as a prior mixing composition which is mixed just prior to the prescribed curing reaction to complete the curing reaction within a shorter time, but also in the form of a stable prepreg.

The light rays used to irradiate the composition of the invention may be light rays which have a spectral range in the photosensitive range of the hexaarylbiimidazole serving as the photosensitive component in the composition of the invention, or of the photosensitive acid-generating agent, or light rays which include (near) infrared rays (i.e., near-infrared and infrared rays) that promote the curing reaction or decomposition of the acid-generating agent. Since the spectral distribution of the light irradiation source is generally continuous, it is usually the case that adjacent ultraviolet rays or (near) infrared rays are irradiated simultaneously during irradiation of, for example, rays in the visible light range, but this essentially presents no problem, and in fact (near) infrared rays will promote the curing reaction of the invention.

Specific examples of light sources to be used according to the invention are light sources which emit light in the wavelength range of 380 nm or longer, such as near-infrared lamps, sodium lamps, halogen lamps, fluorescent lamps, incandescent lamps, sun lamps, metal halide lamps, and natural sunlight. Light of a shorter wavelength range having a higher energy level is effective for a higher curing rate, but in cases of greater thickness of the composition and the use of fiber reinforcing materials such as carbon fibers and aramid fibers or pigments which are relatively impermeable to short wavelength light, irradiation with light of a longer wavelength distribution is more effective, and preferably a halogen lamp, near-infrared lamp or infrared lamp is used.

The light irradiation time cannot be specified for all cases because of differences in the effective wavelength range of the light source, the output, the irradiation distance and the thickness of the molding material, but irradiation is generally suitable for 0.01 hour or more, and preferably 0.05 hour or more. Postcuring may also be performed with heat after the light irradiation. Such treatment is carried out at 40–120° C. for about 30–120 minutes.

Composite material compositions containing conventional ultraviolet photoinitiators have had a disadvantage in that the short wavelength of the ultraviolet light has a strong effect on the fiber reinforcing material and/or filler, and the affected portions undergo insufficient curing. In addition, heat-curing composite material compositions have had problems of storage stability because they contain low temperature-degradable organic peroxides to meet demands of rapid curing at normal temperatures.

In contrast, the curable composite material composition and curing process according to the invention differs from the conventional process using ultraviolet light and organic peroxides in that it is a curing process which utilizes the radical generation induced by reaction between the organic boron compound and the acidic compound, and in addition to the rapid curing reaction due to contact between the organic boron compound and the acidic compound, rapid curing may also be achieved even when the composite material composition to be cured is relatively thick or is a composition with a construction that inhibits light permeation, such as of the fiber reinforcing material, particularly the carbon fibers or aramid fibers and/or filler.

The present invention is explained more fully by way of the following examples which, however, are not intended to be restrictive on the invention. In the examples, all "parts" are by weight.

EXAMPLE 1

A composition comprising:

vinyl ester resin: Ripoxy R-808 (Showa Highpolymer Co., Ltd.) 100 parts organic boron compound: tetra-n-butylammonium triphenyl-n-butyl borate (hereunder, P3B) 0.5 part light/heat-induced latent acid generator (sulfonium compound): CI-2855 (Nippon Soda Co., Ltd.) 1.0 part was used to impregnate a carbon cloth Torayca C06644B (Toray Industries, Inc.) by the hand lay-up method to a lamination of 9 plies, for a thickness of 3 mm (carbon content: 45 wt %).

The top side of the laminated product was coated with a polyethylene terephthalate film (125 $\mu$m Diafoil, Diafoil-Hoechst Co.: hereunder abbreviated to PET film), a 250 W metal halide lamp (product of Mitsubishi Electric Osram Ltd.) was used for light irradiation at a distance of 10 cm, and Barcol hardness measurement after 20 minutes according to JIS K-6911 gave identical values for front and back, while practical levels were also reached for the physical properties. The properties are listed in Table 1.

TABLE 1

|  | Example 1 | Example 2 | Example 3 | Comp. Ex. 1 | Comp. Ex. 2 |
|---|---|---|---|---|---|
| Flexural strength (MPa) | 720 | 782 | 801 | unmeasurable | 680 |
| Flexural strength (GPa) | 49 | 51 | 50 | ditto | 50 |

TABLE 1-continued

|  | Example 1 | Example 2 | Example 3 | Comp. Ex. 1 | Comp. Ex. 2 |
|---|---|---|---|---|---|
| Barcol hardness (front/back) | 65/65 | 65/65 | 65/65 | ditto | 65/65 |
| Usable life indoors (25° C.) | ≧8 H | ≧8 H | ≧8 H | ≧8 H | 45 min |

The compositions containing the above-mentioned light/heat-induced latent acid-generating agents as cationic catalysts had reliably sufficient usable life.

EXAMPLE 2

A composition comprising:

| Ripoxy R-808 (Showa Highpolymer Co., Ltd.) | 100 parts |
|---|---|
| P3B | 0.8 part |
| bis(2-o-chlorophenyl-4,5-diphenyl) imidazole (Wako Pure Chemical Industries Ltd.: hereunder, BIm) | 0.4 part |
| CI-2855 (Nippon Soda Co., Ltd.) | 0.5 part | was used to impregnate carbon cloth Torayca C06644B (Toray Industries, Inc.) by the hand lay-up method to a lamination of 9 plies, for a thickness of 3 mm (carbon content: 45 wt %).

The top side of the laminated product was coated with a PET film, a 250 W metal halide lamp (product of Mitsubishi Electric Osram Ltd.) was used for light irradiation at a distance of 10 cm, and Barcol hardness measurement after 15 minutes according to JIS K-6911 gave identical values for front and back, while practical levels were also reached for the physical properties. The properties are listed in Table 1.

The above-mentioned composition had reliably sufficient usable life.

EXAMPLE 3

A composition comprising:

| Ripoxy R-808 (Showa Highpolymer Co., Ltd.) | 100 parts |
|---|---|
| P3B | 0.3 part |
| BIm (Wako Pure Chemical Industries Ltd.) | 0.1 part |
| Thioxanthen-9-one (Tokyo Kasei Kogyo Co., Ltd.) | 0.5 part |
| CI-2855 (Nippon Soda Co., Ltd.) | 0.7 part | was used to impregnate a carbon cloth Torayca C06644B (Toray Industries, Inc.) by the hand lay-up method to a lamination of 9 plies, for a thickness of 3 mm (carbon content: 45 wt %).

The top side of the laminated product was coated with a PET film, a 250 W metal halide lamp (product of Mitsubishi Electric Osram Ltd.) was used for light irradiation at a distance of 10 cm, and Barcol hardness measurement after 10 minutes according to JIS K-6911 gave identical values for front and back, while practical levels were also reached for the physical properties. The properties are listed in Table 1.

The above-mentioned composition had reliably sufficient usable life.

COMPARATIVE EXAMPLE 1

A composition comprising:

| Ripoxy R-808 (Showa Highpolymer Co., Ltd.) | 100 parts |
|---|---|
| Ultraviolet photoinitiator: Darocure 1173 (Ciba-Geigy Japan Ltd.) | 2.0 parts | was used to impregnate carbon cloth Torayca C06644B (Toray Industries, Inc.) by the hand lay-up method to a lamination of 9 plies, for a thickness of 3 mm (carbon content: 45 wt %).

The top side of the laminated product was coated with a PET film, and a supervoltage water cooled mercury lamp (Hydrocure 2000, product of Orc Manufacturing Co., Ltd.) was used for light irradiation at a distance of 30 cm, but even after 40 minutes of irradiation only the front side had been cured, while the back side remained uncured.

COMPARATIVE EXAMPLE 2

A composition (indoor usable life: 45 minutes) comprising:

| Ripoxy R-808 (Showa Highpolymer Co., Ltd.) | 100 parts |
|---|---|
| Peroxide catalyst: Permek N (NOF Corporation) | 1.5 parts |
| Cobalt naphthenate (cobalt: 6%) | 0.5 part | was used to impregnate a carbon cloth Torayca C06644B (Toray Industries, Inc.) by the hand lay-up method to a lamination of 9 plies, for a thickness of 3 mm (carbon content: 45 wt %).

The top side of the laminated product was coated with a PET film, and after curing at normal temperature for 24 hours followed by after-curing at 120° C. for 2 hours, the Barcol hardness according to JIS K-6911 and the other physical properties were measured, and the results are listed in Table 1.

EXAMPLE 4

A composition comprising:

| Ripoxy R-808 (Showa Highpolymer Co., Ltd.) | 100 parts |
|---|---|
| P3B | 1.0 part |
| light/heat-induced latent acid generator: CI-2855 (Nippon Soda Co., Ltd.) | 0.7 part | was used to impregnate aramid fibers (Kevlar fiber cloth T-500, hereunder abbreviated to Kevlar fibers, product of Toray-DuPont K.K.) by the hand lay-up method to a lamination of 4 plies, for a thickness of 2.5 mm (aramid fiber content: 45 wt %).

The top side of the laminated product was coated with a PET film, a 2 KW halogen lamp (product of Toshiba Lighting & Technology Corporation) was used for light irradiation at a distance of 1 m, and Barcol hardness measurement after 15 minutes according to JIS K-6911 gave almost identical values for front and back of 47/48, while practical cured levels were also reached.

The above-mentioned composition had reliably sufficient usable life.

EXAMPLE 5

A composition comprising:

| | |
|---|---|
| Ripoxy R-808 (Showa Highpolymer Co., Ltd.) | 100 parts |
| P3B | 0.3 part |
| BIm (Wako Pure Chemical Industries Ltd.) | 0.3 part |
| heat-induced latent acid generator: CP-66 (Asahi Denka Kogyo K.K.) | 1.0 part | was used to impregnate Kevlar fiber cloth T-500 by the hand lay-up method to a lamination of 4 plies, for a thickness of 2.5 mm (aramid fiber content: 45 wt %).

The top side of the laminated product was coated with a PET film, a 1 KW halogen lamp (product of RDS Corporation) was used for light irradiation at a distance of 40 cm, and Barcol hardness measurement after 15 minutes according to JIS K-6911 gave almost identical values for front and back of 52/51, while practical cured levels were also reached.

The above-mentioned composition had reliably sufficient usable life.

EXAMPLE 6

A composition comprising:

| | |
|---|---|
| Unsaturated polyester resin Rigolac G-200 (Showa Highpolymer Co., Ltd.) | 100 parts |
| P3B | 0.3 part |
| BIm (Wako Pure Chemical Industries Ltd.) | 0.3 part |
| light-induced latent acid generator: SP-150 (Asahi Denka Kogyo K.K.) | 1.0 part | was used to impregnate Kevlar fiber cloth T-500 by the hand lay-up method to a lamination of 4 plies, for a thickness of 2.5 mm (aramid fiber content: 45 wt %).

The top side of the laminated product was coated with a PET film, a 250 W metal halide lamp (product of Mitsubishi Electric Osram Ltd.) was used for light irradiation at a distance of 10 cm, and Barcol hardness measurement after 10 minutes according to JIS K-6911 gave almost identical values for front and back of 49/50, while practical cured levels were also reached.

The above-mentioned composition had reliably sufficient usable life.

EXAMPLE 7

A composition comprising:

| | |
|---|---|
| Rigolac G-200 (Showa Highpolymer Co., Ltd.) | 100 parts |
| P3B | 0.4 part |
| BIm (Wako Pure Chemical Industries Ltd.) | 0.6 part |
| methyl p-toluenesulfonate (Wako Pure Chemical Industries Ltd.) | 0.5 part | was used to impregnate Kevlar fiber cloth T-500 by the hand lay-up method to a lamination of 4 plies, for a thickness of 2.5 mm (aramid fiber content: 45 wt %).

The top side of the laminated product was coated with a PET film, a 250 W metal halide lamp (product of Mitsubishi Electric Osram Ltd.) was used for light irradiation at a distance of 10 cm, and Barcol hardness measurement after 20 minutes according to JIS K-6911 gave almost identical values for front and back of 49/50, while the physical properties also reached practical cured levels.

The above-mentioned composition had reliably sufficient usable life.

COMPARATIVE EXAMPLE 3

A composition comprising:

Rigolac G-200 (Showa Highpolymer Co., Ltd.) 100 parts Ultraviolet photopolymerization initiator: Irgacure 1700 (Ciba-Geigy Japan Ltd.) 2.0 parts was used to impregnate Kevlar fiber cross T-500 by the hand lay-up method to a lamination of 4 plies, for a thickness of 2.5 mm (aramid fiber content: 45 wt %).

The top side of the laminated product was coated with a PET film, and a 3 KW gallium lamp (product of Ushio Inc.) was used for light irradiation at a distance of 1 m, but even after 40 minutes of irradiation only the front side had been cured, while the back side remained uncured.

EXAMPLE 8

A composition comprising:

| | |
|---|---|
| Acrylic resin: NK ester BPE-100 (Shin-Nakamura Chemical Co. Ltd.) | 100 parts |
| P3B | 0.2 part |
| BIm (Wako Pure Chemical Industries Ltd.) | 0.3 part |
| light/heat-induced acid generator: CI-2635 (Nippon Soda Co., Ltd.) | 0.6 part | was used to impregnate Kevlar fiber cloth T-500 by the hand lay-up method to a lamination of 4 plies, for a thickness of 2.5 mm (aramid fiber content: 45 wt %).

The top side of the laminated product was coated with a PET film, a 250 W metal halide lamp (product of Mitsubishi Electric Osram Ltd.) was used for light irradiation at a distance of 10 cm, and Barcol hardness measurement after 20 minutes according to JIS K-6911 gave almost identical values for front and back of 44/43, while practical cured levels were also reached.

The above-mentioned composition had reliably sufficient usable life.

Polymerizable Unsaturated Compound Synthesis Examples

Synthesis Example 1 Synthesis of unsaturated polyester resin UP-1

Into a reactor equipped with a stirrer, reflux condenser, nitrogen gas inlet and thermometer there were charged 100 moles of propylene glycol, 50 moles of phthalic anhydride and 50 moles of maleic anhydride, and reaction was conducted at 210° C. by a conventional method until the acid value reached 40 mgKOH/g.

Hydroquinone was then added at 0.015 part based on 100 parts of the reaction product, and after cooling to 160° C. styrene monomer was mixed therewith in an amount of 35 wt % with respect to the reaction product, to obtain the unsaturated polyester resin UP-1 with an acid value of 25 mgKOH/g.

Synthesis Example 2 Synthesis of unsaturated polyester resin UP-2

Into a reactor equipped with a stirrer, reflux condenser, nitrogen gas inlet and thermometer there were charged 1000 g of the UP-1 synthesized in Synthesis Example 1, 0.446 mole (63.3 g) of glycidyl methacrylate with 1.2 equivalents of the carboxyl groups of the UP-1, and tris (dimethylaminomethyl) phenol and hydroquinone at 0.2 part and 0.015 part, respectively, with respect to 100 parts of the total of UP-1 and glycidyl methacrylate, and then reaction was conducted at 110–130° C. for 3–4 hours while blowing in air, to obtain the unsaturated polyester resin UP-2 with an acid value of 0 mgKOH/g.

Synthesis Example 3 Synthesis of vinyl ester resin VE-1

Into a reactor equipped with a stirrer, reflux condenser, nitrogen gas inlet and thermometer there were charged 0.5 mole (484 g) of Epikote 1001 (epoxy resin by Yuka Shell Co)., epoxy equivalents: 484), 0.95 mole (82 g) of methacrylic acid, tris(dimethylaminomethyl) phenol and hydroquinone at 0.2 part and 0.015 part, respectively, with respect to 100 parts of the total of the epoxy resin and methacrylic acid and 116.5 parts of styrene monomer, and then reaction was conducted at 110–130° C. for 3–4 hours while blowing in air, suspending the reaction when the acid value reached 0 mgKOH/g. Styrene monomer was then added until the total styrene monomer content reached 45% with respect to the vinyl ester resin, to obtain VE-1 with an acid value of 0 mgKOH/g.

Synthesis Example 4 Synthesis of terminal maleic acid-type oligomer MK-1

Into a reactor equipped with a stirrer, reflux condenser, nitrogen gas inlet and thermometer there were charged 10 moles (981 g) of maleic anhydride, 2 moles (152 g) of propylene glycol, 6.5 moles (1391 g) of trimethylolpropane diallyl ether and copper naphthenate (metal content: 5%) and hydroquinone at 0.1 part and 0.05 part, respectively, with respect to 100 parts of the total of the maleic anhydride and propylene glycol and trimethylolpropane diallyl ether, and then reaction was conducted at 110–130° C. for 4–5 hours while blowing in air, to obtain the terminal maleic acid-type oligomer MK-1 with an acid value of 207 mgKOH/g.

EXAMPLE 9

A mixture of 0.5 part P3B with a composition comprising:

| UP-1 | 100 parts |
| BIm | 0.5 part |
| 2-mercaptobenzothiazole (Wako Pure Chemical Industries Ltd. hereunder MBT) | 0.5 part | was immediately used to impregnate a #450 continuous glass mat, laminating it to a thickness of 3 mm (glass content: 30 wt %), and after coating quickly with a Mylar film, a light source (tradename: AL Spotlight ALF-10, 1 KW, product of RDS Corporation) including a wavelength range of 390–1200 nm was used for irradiation at a distance of 50 cm, with curing achieved at 5 minutes. The hardness of the cured product was measured with a Model 934–1 Barcol hardness meter according to JIS K-6911, giving a front side hardness of 55 and a back side hardness of 53. The results are listed in Table 2.

TABLE 2

|  | Example 9 | Comp. Ex. 4 | Comp. Ex. 5 |
| --- | --- | --- | --- |
| Resin | UP-1 | UP-2 | UP-1 |
| Acid value | 25 | 0 | 25 |
| Initiator | P3B: 0.5 | P3B: 0.5 |  |
|  | BIm: 0.5 | BIm: 0.5 | BIm: 0.5 |
|  | MBT: 0.5 | MBT: 0.5 | MBT: 0.5 |

TABLE 2-continued

|  | Example 9 | Comp. Ex. 4 | Comp. Ex. 5 |
| --- | --- | --- | --- |
| Irradiating conditions | AL Spotlight ALF-10, 1 KW Irradiation distance: 50 cm | | |
| Curing time | 5 minutes | 20 minutes | 20 minutes |
| *Barcol hardness | 55/53 | 48/45 | 45/42 |

*Barcol hardness (934-1): front side/back side values

COMPARATIVE EXAMPLE 4

A mixture of 0.5 part P3B with a composition comprising:

| UP-1 | 100 parts |
| BIm | 0.5 part |
| MBT | 0.5 part | was immediately used to impregnate a #450 continuous glass mat, laminating it to a thickness of 3 mm (glass content: 30 wt %), and after coating quickly with a Mylar film, the same light in Example 9 was used for irradiation at a distance of 50 cm, with curing achieved at 20 minutes. The hardness of the cured product was measured with a Model 934-1 Barcol hardness meter according to JIS K-6911. The results are listed in Table 2.

COMPARATIVE EXAMPLE 5

A composition comprising:

| UP-1 | 100 parts |
| BIm | 0.5 part |
| MBT | 0.5 part | was used to impregnate a #450 continuous glass mat, laminating it to a thickness of 3 mm (glass content: 30 wt %), and after coating quickly with a Mylar film, the same light in Example 9 was used for irradiation at a distance of 50 cm, with curing achieved at 20 minutes. The hardness of the cured product was measured with a Model 934-1 Barcol hardness meter according to JIS K-6911. The results are listed in Table 2.

EXAMPLE 10

After adding 10 parts MK-1 to 100 parts of VE-1 to an acid value of 23, 0.5 part of BIm and 0.5 part of MBT were mixed therewith as visible light photoinitiators and then immediately after mixing 0.5 part of P3B therewith the mixture was used to impregnate a #450 continuous glass mat, laminating it to a thickness of 3 mm (glass content: 30 wt %), and after coating quickly with a Mylar film, the same light in Example 9 was used for irradiation at a distance of 50 cm, with curing achieved at 5 minutes. The hardness of the cured product was measured with a Model 934-1 Barcol hardness meter according to JIS K-6911. The results are listed in Table 3.

TABLE 3

|  | Example 10 | Example 11 | Comp. Ex. 6 |
|---|---|---|---|
| Resin |  | VE-1 |  |
| Additive | MK-1 10 phr | methacrylic acid 5 phr | — |
| Acid value | 23 | 35 | 0 |
| Initiator | P3B: 0.5 BIm: 0.5 MBT: 0.5 | P3B: 0.5 BIm: 0.5 MBT: 0.5 | P3B: 0.5 BIm: 0.5 MBT: 0.5 |
| Irradiating conditions |  | AL Spotlight ALF-10, 1 KW Irradiation distance: 50 cm |  |
| Curing time | 5 minutes | 10 minutes | 20 minutes |
| *Barcol hardness | 58/56 | 60/59 | 51/47 |

*Barcol hardness (934-1): front side/back side values

EXAMPLE 11

After adding 5 parts methacrylic acid to 100 parts of VE-1 to an acid value of 35, 0.5 part of BIm and 0.5 part of MBT were mixed therewith as visible light photoinitiators and then immediately after mixing 0.5 part of P3B therewith the mixture was used to impregnate a #450 continuous glass mat, laminating it to a thickness of 3 mm (glass content: 30 wt %), and after coating quickly with a Mylar film, the same light in Example 9 was used for irradiation at a distance of 50 cm, with curing achieved at 10 minutes. The hardness of the cured product was measured with a Model 934-1 Barcol hardness meter according to JIS K-6911. The results are listed in Table 3.

COMPARATIVE EXAMPLE 6

A composition comprising:

| VE-1 | 100 parts |
|---|---|
| BIm | 0.5 part |
| MBT | 0.5 part |
| P3B | 0.5 part | was used immediately after mixing to impregnate a #450 continuous glass mat, laminating it to a thickness of 3 mm (glass content: 30 wt %), and after coating quickly with a Mylar film, the same light in Example 9 was used for irradiation at a distance of 50 cm, with curing achieved at 20 minutes. The hardness of the cured product was measured with a Model 934-1 Barcol hardness meter according to JIS K-6911. The results are listed in Table 3.

EXAMPLE 12 SPRAY-UP

Resin Composition

To 100 parts of UP-1 there were added 30 parts of calcium carbonate (tradename: Softon 1200, product of Bihokufunka Kogyo K.K.), 2 parts of Aerosil #200 (product of Nippon Aerosil Co., Ltd.) and 10 parts of styrene monomer, and the mixture was prepared to a viscosity of 7 poise/25° C.

Initiator Composition

An initiator solution (40%) was prepared by dissolving 100 parts of BIm, 100 parts of MBT and 100 parts of P3B in 450 parts of N-methylpyrrolidone. The initiator solution was then adjusted to 0.5 part of each initiator component to 100 parts of UP-1.

Reinforcing Material

Glass roving RER346-GR34 (product of Nippon Sheet Glass Co., Ltd.) was prepared to a glass cut length of 1 inch.

Molding

A spray-up molding machine, Super Slave (pressure ratio 1:14, product of Binks Manufacturing Co.) was used for tip mixture of the above-mentioned resin composition, initiator and glass (1 inch) at a glass content of 33%, in a FRP flat mold of 60 cm width×80 cm height, raised to an angle of 80°.

After subsequent degassing treatment with a degassing roll, the light source of Example 9 including a wavelength range of 390–1200 nm was immediately used for irradiation at a distance of 50 cm, upon which the resin composition cured at 1.5 minutes with 1 cm drip over from the top end of the FRP mold. Light irradiation was continued, and after 15 minutes of irradiation the Barcol hardness and flexural strength of the cured product were measured according to JIS K-6911, giving sufficient levels. The environment of the working area was also measured with a Kitagawa-type gas-detecting tube (Komyo Rikagaku Kogyo K.K.) 30 minutes after degassing. The results are listed in Table 4.

TABLE 4

|  | Example 12 | Comp. Ex. 7 | Comp. Ex. 8 | Comp. Ex. 9 |
|---|---|---|---|---|
| Resin |  | UP-1: 100 styrene monomer: 10 |  |  |
| Initiator | P3B 0.5 BIm 0.5 MBT 0.5 | Irgacure-1700 2.0 | BIm 0.5 MBT 0.5 | Permek N: 1.5 cobalt naphthenate 0.5 |
| Filler |  | Softon 1200: 30 Aerosil #200: 2 |  |  |
| Viscosity ps/25° C. | 7 | 7.3 | 7.1 | 7.2 |
| Glass fibers |  | fiber length/content = 1 inch/33 wt % |  |  |
| Irradiating conditions | AL Spotlight | Unirek URM-300 | AL Spotlight | Normal temperature curing |
| Temperature of working area (° C.) | 20 | 21 | 22 | 22 |
| Curing time | 1.5 min | 4 min (surface only) | 3 min | 30 min |
| Drip condition | 1 cm | constant drip | 2 cm | 15 cm |
| *Environment measurement results | 35 | 150 | 50 | 130 |
| Flexural strength | 122 Mp | unmeasurable | 110 Mp | 102 Mp |
| Flexural modulus | 6.4 Gp | unmeasurable | 6.0 Gp | 5.3 Gp |
| *Barcol hardness | 38/37 | unmeasurable | 36/31 | 29/22 |

*Environment measurement results: styrene content (ppm)
*Barcol hardness (934-1): front side/back side values Also, after degassing treatment with a degassing roll it was immediately irradiated with sunlight, and the resin composition cured at 1 minute with absolutely no drip over from the top end of the FRP mold. Light irradiation was continued, and after 10 minutes of irradiation the Barcol hardness and flexural strength of the cured product were measured according to JIS K-6911, giving sufficient levels. The results are listed in Table 5.

TABLE 5

|  | Example 12 | Comp. Ex. 7 | Comp. Ex. 8 | Comp. Ex. 9 |
|---|---|---|---|---|
| Resin |  | UP-1: 100 styrene monomer: 10 |  |  |
| Initiator | P3B 0.5 BIm 0.5 MBT 0.5 | Irgacure-1700 2.0 | BIm 0.5 MBT 0.5 | Permek N: 1.5 cobalt naphthenate 0.5 |

TABLE 5-continued

|  | Example 12 | Comp. Ex. 7 | Comp. Ex. 8 | Comp. Ex. 9 |
|---|---|---|---|---|
| Filler | | Softon 1200: 30 Aerosil #200: 2 | | |
| Viscosity ps/25° C. | 7 | 7.3 | 7.1 | 7.2 |
| Glass fibers | | fiber length/content = 1 inch/33 wt % | | |
| Irradiating conditions | | Sunlight | | Normal temperature curing |
| Temperature of working area (° C.) | 23 | 24 | 25 | 22 |
| Curing time | 1 min | 1 min (surface only) | 1.5 min | 30 min |
| Drip condition | none | constant drip | 1 cm | 15 cm |
| *Environment measurement results | 20 | 150 | 30 | 130 |
| Flexural strength | 125 Mp | unmeasurable | 115 Mp | 102 Mp |
| Flexural modulus | 6.6 Gp | unmeasurable | 6.2 Gp | 5.3 Gp |
| *Barcol hardness | 39/38 | unmeasurable | 36/33 | 29/22 |

*Environment measurement results: styrene content (ppm)
*Barcol hardness (934-1): front side/back side values

COMPARATIVE EXAMPLE 7 SPRAY-UP

The same procedure was conducted with the same composition as in Example 12, except that the polymerization initiator was changed to the ultraviolet/visible light initiator Irgacure 1700 (Ciba-Geigy Corporation) and adjusted to 2.0 parts of Irgacure 1700 to 100 parts of UP-1, and a gallium lamp, Unirek URM-300, 3 KW at a distance of 1 m (Ushio Inc.) was used, upon which the front side cured at 2 minutes, while the interior failed to cure even with 1 hour of irradiation and dripping of the resin composition from the FRP mold could not be stopped. The environment of the working area was also measured 30 minutes after degassing, in the same manner as Example 12. The results are listed in Table 4.

Also, after degassing treatment with a degassing roll and immediate irradiation with sunlight, the front side cured at 1 minute, but the interior failed to cure even with 1 hour of irradiation, and dripping of the resin composition from the FRP mold could not be stopped.

COMPARATIVE EXAMPLE 8 SPRAY-UP

An initiator solution (40%) was prepared by dissolving 100 parts of BIm and 100 parts of MBT in 300 parts of N-methylpyrrolidone. The initiator solution was then adjusted to 0.5 part of each initiator component to 100 parts of UP-1, and the same procedure was conducted with the same composition as in Example 12, upon which irradiation with the AL Spotlight used in Example 12 accomplished curing at 3 minutes with 2 cm of drip of the resin composition from the top end of the FRP mold. Light irradiation was continued, and after 15 minutes of irradiation the Barcol hardness and flexural strength of the cured product were measured according to JIS K-6911, giving sufficient levels. The environment of the working area was also measured with a Kitagawa-type gas-detecting tube (Komyo Rikagaku Kogyo K.K.) 30 minutes after degassing. The results are listed in Table 4.

Also, after degassing treatment with a degassing roll it was immediately irradiated with sunlight, and the resin composition cured at 1.5 minutes with 1 cm of drip from the top end of the FRP mold. Light irradiation was continued, and after 10 minutes of irradiation the Barcol hardness and flexural strength of the cured product were measured according to JIS K-6911, giving sufficient levels. The results are listed in Table 5.

COMPARATIVE EXAMPLE 9 SPRAY-UP

The same procedure was conducted with the same composition as in Example 12, except that the initiator composition was changed to the normal temperature-curing agent Permek N (NOF Corporation)/cobalt naphthenate, the resin composition had cobalt naphthenate preadded at 0.5 part to 100 parts of UP-1, and the initiator system was adjusted to 1.5 parts of Permek N to 100 parts of UP-1.

After degassing treatment with a degassing roll it was left to stand at normal temperature, upon which the resin composition cured at 30 minutes with 15 cm drip from the top end of the FRP mold. The environment of the working area was also measured with a Kitagawa-type gas-detecting tube (Komyo Rikagaku Kogyo K.K.) 30 minutes after degassing.

After one day of standing, the Barcol hardness and flexural strength were measured according to JIS K-6911. The results are listed in Table 4.

EXAMPLE 13 RTM

Resin Composition

To 100 parts of VE-1 there were added 10 parts of MK-1 and 20 parts of styrene monomer, and the mixture was prepared to a viscosity of 75 centipoise/25° C.

Initiator Composition

An initiator solution (40%) was prepared by dissolving 100 parts of BIm, 100 parts of MBT and 100 parts of P3B as polymerization initiators in 450 parts of N-methylpyrrolidone. The initiator solution was then adjusted to 0.5 part of each initiator component to 100 parts of VE-1.

Reinforcing Material

A #450 continuous glass mat (product of Asahi Fiber Glass Co., Ltd.) was used.

Molding

A 2 ply #450 continuous mat was preset in a 30×30×0.3 cm flat molding mold (top: 1.3 mm acrylic plate, bottom: steel plate) provided with a resin injection port and a vent port, and a mixture of the above-mentioned resin composition and initiator composition prepared just prior was injected therein at a resin injection pressure of 0.7 kg/cm$^2$ until the resin overflowed from the vent port, after which the injection port and vent port were sealed shut. The AL Spotlight used in Example 12 was used immediately for 20 minutes of irradiation at a distance of 30 cm, and measurement of the Barcol hardness and flexural strength gave sufficient levels. The results are listed in Table 6.

Also, upon irradiation for 20 minutes with sunlight instead of the AL Spotlight after injection of the resin, the Barcol hardness and flexural strength were at sufficient levels. The results are listed in Table 6.

COMPARATIVE EXAMPLE 10 RTM

The same procedure was conducted as in Example 13, except that the polymerization initiator in Example 13 was changed to the ultraviolet/visible light initiator Irgacure 1700 (Ciba-Geigy Corporation) and adjusted to 2.0 parts of Irgacure 1700 to 100 parts of the resin composition of Example 13, and a gallium lamp, Unirek URM-300, 3 KW at a distance of 1 m (Ushio Inc.) was used, upon which the degree of curing on the back side was insufficient at 30 minutes of irradiation, and sufficient curing could not even be achieved with 30 minutes of sunlight irradiation. The results of measuring the Barcol hardness and flexural strength are listed in Table 6.

COMPARATIVE EXAMPLE 11 RTM

The same procedure was conducted as in Example 13, except that the initiator composition in Example 13 was changed to the normal temperature curing agent Percure A (NOF Corporation)/cobalt naphthenate, the resin composition used had cobalt naphthenate preadded at 0.5 part to 100 parts of the resin composition of Example 13, and the initiator system was adjusted to 1.0 part of Percure A to 100 parts of the resin composition. The mold was released one hour after injection, and the Barcol hardness and flexural strength after one day of standing at normal temperature were measured. The results are listed in Table 6.

The Barcol hardness and flexural strength were also measured for a sample which was aftercured for 2 hours at 80° C. after the normal temperature curing. The results are listed in Table 6.

TABLE 6

|  | Example 13 | Comp. Ex. 10 | | Comp. Ex. 11 | |
|---|---|---|---|---|---|
| Resin | VE-1: 100 | MK-1: 10 | | styrene: 10 | |
| Initiator | P3B 0.5<br>BIm 0.5<br>MBT 0.5 | Irgacure-1700<br>2.0 | | Percure A: 1.0<br>cobalt<br>naphthenate: 0.5 | |
| Glass content (wt %) | 27 | 25 | | 25 | |
| Irradiating conditions | AL lamp<br>20 min | sun-<br>light<br>20<br>min | Unirek<br>30 min | sun-<br>light<br>30<br>min | after 1<br>day at<br>normal<br>temp. | normal<br>temp. +<br>80 °/2 H |
| Flexural strength (Mp) | 102 | 110 | unmeas-<br>urable | 61 | 75 | 91 |
| Flexural modulus (Gp) | 4.5 | 4.9 | unmeas-<br>urable | 2.5 | 3.0 | 4.9 |
| *Barcol hardness | 33/31 | 37/35 | 3/0 | 8/6 | 10/10 | 27/26 |

*Barcol hardness (934-1): front side/back side values

The composite material composition and curing process according to the invention differs from the conventional process using ultraviolet light and organic peroxides in that it is a curing process which uses a polymerization initiator which consists of a combination of an organic boron compound and an acidic compound, together with a visible light photoinitiator if necessary, and accomplishes curing of the composition by light irradiation and/or heating; rapid curing of the composite material composition may thus be achieved by a safe and simple process even when the composition to be cured is relatively thick or is a composition with a construction that inhibits light permeation, such as a fiber reinforcing material and/or filler.

In particular, the composite material composition of the invention simultaneously overcomes the difficulty of curing compositions containing constituents which inhibit light permeation, such as fiber reinforcing materials and fillers, which had been a problem with photocurable compositions of the prior art, and the poor storage stability resulting from admixture of low temperature-decomposing peroxides, which had been a problem with heat-curable compositions.

What is claimed is:
1. A curable composite material composition comprising
(A) a polymerizable unsaturated resin,
(B) a fiber reinforcing material and/or filler and
(C) a polymerization initiator comprising
   (a) an organic boron compound represented by the general formula (1)

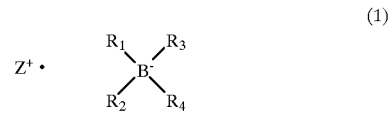

wherein $R_1$, $R_2$, $R_3$, and $R_4$ each independently represent an alkyl group, an aryl group, an allyl group, an aralkyl group, an alkenyl group, an alkynyl group, a silyl group, a heterocyclic group, a halogen atom, a substituted alkyl group, a substituted aryl group, a substituted allyl group, a substituted aralkyl group, a substituted alkenyl group, a substituted alkynyl group or a substituted silyl group, and $Z^+$ represents a cation,
   (b) an acidic compound selected from the group consisting of oligomers and polymers of maleic acid, maleic anhydride, fumaric acid, half esters of fumaric acid, acrylic acid, methacrylic acid and itaconic acid, and
   (c) a hexaarylbiimidazole compound represented by the general formula (2)

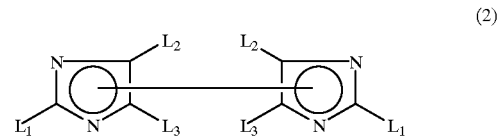

wherein $L_1$, $L_2$ and $L_3$ each independently represent an aryl group or a substituted aryl group.

2. A curable composite material composition according to claim 1, which further comprises (D) a visible light photoinitiator.

3. A composite material composition according to claim 1, wherein the polymerizable unsaturated resin is selected from the group consisting of unsaturated polyester resins, vinyl ester resins and acrylic resins.

4. A composite material composition according to claim 1, wherein the fiber reinforcing material is selected from the group consisting of carbon fibers, aramid fibers and glass fibers.

5. A composite material composition according to claim 1, wherein the polymerizable unsaturated resin is a vinyl ester resin.

6. A composite material composition according to claim 1, wherein the fiber reinforcing material is a carbon fiber.

7. A composite material composition according to claim 1, wherein the organic boron compound is tetra-n-butylammonium triphenyl-n-butylborate.

8. A composite material composition according to claim 1, wherein the acidic compound is an oligomerized adduct of maleic anhydride with propylene glycol and trimethylolpropane diallyl ether.

9. A composite material composition according to claim 1, wherein the hexaarylbiimidazole compound is bis-(2-o-chlorophenyl-4,5-diphenylimidazole).

10. A composite material composition according to claim 1, which further comprises trimethylbenzoyldiphenylphosphine oxide.

11. A curable composite material composition comprising a vinyl ester resin; a carbon fiber; and a polymerization initiator which comprises tetra-n-butylammonium triphenyl-n-butylborate, an oligomerized adduct of maleic anhydride with propylene glycol and trimethylolpropane diallyl ether, and bis-(2-o-chlorophenyl-4,5-diphenylimidazole).

12. A curable composite material composition comprising a vinyl ester resin; a carbon fiber; a polymerization initiator which comprises tetra-n-butylammonium triphenyl-n-butylborate, an oligomerized adduct of maleic anhydride with propylene glycol and trimethylolpropane diallyl ether, and bis-(2-o-chlorophenyl-4,5-diphenylimidazole); and trimethylbenzoyldiphenylphosphine oxide.

* * * * *